United States Patent [19]
Grieff et al.

[11] Patent Number: 6,154,789
[45] Date of Patent: Nov. 28, 2000

[54] PERIPHERAL CONTROLLER COMPRISING FIRST MESSAGING UNIT FOR COMMUNICATION WITH FIRST OS DRIVER AND SECOND MESSAGING UNIT FOR COMMUNICATION WITH SECOND OS DRIVER FOR MASS-STORAGE PERIPHERAL

[75] Inventors: Thomas W. Grieff, Spring; Bryan A. Jones, Houston; Michael L. Sabotta, Cypress, all of Tex.

[73] Assignee: Compaq Computer Corporation, Houston, Tex.

[21] Appl. No.: 09/097,409

[22] Filed: Jun. 15, 1998

[51] Int. Cl.[7] .............................. G06F 3/00; G06F 13/12; G06F 13/38
[52] U.S. Cl. ................................ 710/14; 710/8; 710/10; 710/62; 710/64
[58] Field of Search .................................. 710/8, 10, 11, 710/14, 62, 64; 395/828, 830, 831, 834, 882, 884

[56] References Cited

U.S. PATENT DOCUMENTS

| | | | |
|---|---|---|---|
| 4,747,040 | 5/1988 | Blanset et al. | 364/200 |
| 5,504,904 | 4/1996 | Dayan et al. | 395/700 |
| 5,701,514 | 12/1997 | Keener et al. | 395/834 |
| 5,742,844 | 4/1998 | Feldman | 395/800.32 |
| 5,883,864 | 3/1999 | Saliba | 369/30 |
| 5,926,228 | 7/1999 | Jeon et al. | 348/554 |
| 5,959,993 | 9/1999 | Varma et al. | 370/397 |
| 5,991,811 | 11/1999 | Ueno et al. | 709/231 |
| 6,003,017 | 12/1999 | Rang et al. | 705/35 |
| 6,012,105 | 1/2000 | Rubbmark et al. | 710/14 |
| 6,016,549 | 1/2000 | Matsushiba et al. | 713/324 |
| 6,035,345 | 3/2000 | Lee | 710/8 |
| 6,052,749 | 4/2000 | Purcell et al. | 710/71 |
| 6,052,781 | 4/2000 | Weber | 713/200 |
| 6,061,752 | 5/2000 | Jones et al. | 710/103 |

Primary Examiner—Thomas C. Lee
Assistant Examiner—Tanh Nguyen
Attorney, Agent, or Firm—Akin, Gump, Strauss, Hauer & Feld, LLP

[57] ABSTRACT

An embodiment of the present invention provides a peripheral controller for coupling a mass storage peripheral to a computer system. In a disclosed embodiment the peripheral controller is a disk array controller programmed for RAID. The peripheral controller includes a first messaging unit (FMU), a second messaging unit (SMU), and a peripheral interface which are connected by a local bus. The FMU responds to messages from a first operating system driver. The SMU responds to messages from a different second operating system driver. In one embodiment, the FMU responds to commands from the first operating system driver which is non-standard. In another embodiment, the SMU responds to commands from the second operating system driver which is compatible with the I2O standard. In the disclosed embodiment, the peripheral interface controls mass storage peripherals in response to messages sent to the FMU or the SMU.

22 Claims, 4 Drawing Sheets

PERIPHERAL CONTROLLER COMPRISING FIRST MESSAGING UNIT FOR COMMUNICATION WITH FIRST OS DRIVER AND SECOND MESSAGING UNIT FOR COMMUNICATION WITH SECOND OS DRIVER FOR MASS-STORAGE PERIPHERAL

CROSS-REFERENCE TO RELATED APPLICATIONS

Not applicable.

STATEMENT REGARDING FEDERALLY SPONSORED RESEARCH

Not applicable.

BACKGROUND OF THE INVENTION

1. Field of the Invention

This invention relates to peripherals controllers and more specifically to a disk array controller that provides two different messaging units.

2. Description of the Related Art

Servers are critical components of a computer network as their efficiency and reliability directly impact the efficiency and reliability of the computer network as a whole. Servers have typically been utilized to provide access to shared printers and files. As a general rule, a computer network has multiple file servers which have traditionally been used as storage hubs for various files. In a typical application, a copy of a stored file is transferred to a client on demand with an updated file being returned to the server for storage. As a result of on-demand file transfer, any delay in accessing files on a disk subsystem directly affects the efficiency of the network.

The requirement for high performance efficient networks has led to advances in disk drives and in disk subsystem architectures. Disk drive storage sizes have increased, access times have decreased, and data transfer rates have increased. However, while disk drive technology has advanced, processing capabilities of personal computers and workstations have also advanced. As more clients are added to a given network and the processing capability of those clients increase, there is a continuing push to further enhance the performance of disk subsystems servicing that network.

In response to the need for reliable inexpensive disk drive subsystems, redundant array of inexpensive disks (RAID) configurations have been developed. RAID implementations can provide error detection and duplicate storage of information on a disk drive subsystem in the event one or more disk drives in the disk drive subsystem fail. Some of the advantages provided by RAID subsystems have been higher data transfer rates, increased disk capacity, higher input/output (I/O) rates, and faster data access. Depending upon which level of RAID was implemented, disk striping, mirroring, parity checking, or some combination was employed. For example, RAID level 4 implements block interleaved data striping with parity checking, with parity information being stored on a single disk drive. In contrast, RAID level 5 strips both data and parity information across multiple disk drives. These RAID implementations and others are well known to those of ordinary skill in the art.

In further response to increased demand for reduction of bottlenecks encountered when performing I/O operations, the industry has sought to develop new I/O architectures. One such I/O architecture is known as Intelligent I/O (I2O).

I2O is a relatively new I/O architecture which attempts to reduce I/O bottlenecks through the use of special I/O processors. The I/O processors perform tasks which include interrupt handling, data transfer, and buffering. The tasks performed by the I/O processors free a host processor to perform other tasks thus increasing a computer systems' efficiency. A primary objective of I2O was to provide an I/O device driver architecture that was independent of both the I/O device and the host operating system (OS).

To achieve this objective, a typical I2O driver consists of an operating system specific module (OSM) and a hardware device module (HDM). The OSM and HDM are autonomous and can perform independent tasks without sending data over a system I/O bus. The HDM and OSM interface with each other through a communication system comprised of a message layer and a transport layer. This communication system is similar to a connection oriented networking protocol. In a connection oriented network protocol two parties interested in exchanging information utilize a message layer to set-up a connection and to exchange control information and data.

In the I2O model, the message layer sets up a communication session between the HDM and the OSM and the transport layer defines how the HDM and the OSM share information. Similar to many standard communication protocols, the message layer resides on the transport layer. In a typical application, when the OSM is presented with a request from a host OS it translates the request into an I2O message and dispatches it to the appropriate HDM for processing. When the HDM has completed the request it dispatches the result back to the OSM by sending a message through the I2O message layer.

In the I2O environment RAID controller functionality may be implemented through a device driver module (DDM) or with an intermediate service module (ISM). As in a typical I2O environment, RAID module functions are performed independent of the OS, type of processor or bus (whether local or system). In the current I2O environment, DMA is utilized in the movement of data but not in command movement.

Other methods of transferring commands from a host processor to a peripheral controller are known to those of ordinary skill in the art. For example, a method of command passing between a host processor and a disk array controller is discussed in "DISK ARRAY CONTROLLER HAVING COMMAND DESCRIPTOR BLOCKS UTILIZED BY BUS MASTER AND BUS SLAVE FOR RESPECTIVELY PERFORMING DATA TRANSFER OPERATIONS" by Chadler et al. U.S. Pat. No. 5,448,709, assigned to the assignee of the present invention which is hereby incorporated by reference.

For various reasons, the ability to upgrade being one such reason, having an I/O device controller that is compatible with multiple architectures is often desirable. Disk drive controllers with selectable interfaces, for compatibility with multiple architectures, are known in the art. One example of such a configurable drive interface can be found in "MODE-SELECTABLE INTEGRATED DISK DRIVE FOR COMPUTER" by Bush et al. U.S. Pat. No. 5,150,465, assigned to the assignee of the present invention which is hereby incorporated by reference.

SUMMARY OF THE INVENTION

An embodiment of the present invention provides a peripheral controller for coupling a mass storage peripheral to a computer system. In a disclosed embodiment the peripheral controller is a disk array controller. As is typical, the computer system runs an operating system (OS). The disk array controller includes a first messaging unit (FMU), a second messaging unit (SMU), and a peripheral interface which are connected by a local bus. The FMU responds to messages from a first OS driver. The SMU responds to messages from a different second OS driver. The peripheral interface controls a mass storage peripheral in response to messages sent to the first or second messaging units.

In a disclosed embodiment, the local bus is a PCI bus and the peripheral interface is a SCSI interface. In an embodiment, the disk array controller of the present invention is programmed for RAID. In a disclosed embodiment, the FMU responds to commands from a first OS driver which is non-standard. In another disclosed embodiment, the SMU responds to commands from a second OS driver which is compatible with the I2O standard. In that embodiment, the second operating system driver includes an OSM and a HDM. In that embodiment the SMU also operates as a slave on the local bus and is controlled by the FMU.

An advantage of the present invention is that the disk array controller interface is configurable. Which configuration is most advantageous, from a system designer's viewpoint, is determined by whether speed or standardization is most important. In one configuration a high speed proprietary driver is implemented. In another configuration a lower speed (in comparison to the high speed proprietary driver) I2O compatible driver is implemented. When speed is the main I/O consideration, the high speed proprietary driver is installed. When I2O compatibility is desired, the lower speed I2O compatible driver is installed.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF INVENTION

The following disclosures are hereby incorporated by reference:

U.S. application Ser. No. 09/097,408, entitled "HIDING PERIPHERAL MEMORY TRANSACTIONS ON A LOCAL BUS WITHIN A PERIPHERAL CONTROLLER FROM A HOST SYSTEM BUS", by Michael L. Sabotta, Bryan A. Jones, and Thomas W. Grieff, filed concurrently herewith; and U.S. application Ser. No. 09/097,493, entitled "A TECHNIQUE FOR HOT PLUGGING A PERIPHERAL CONTROLLER CARD CONTAINING PCI AND SCSI BUSES ON A SINGLE CONNECTOR INTO A HOST SYSTEM BOARD", by Bryan A. Jones, Michael L. Sabotta, and Thomas W. Grieff, filed concurrently herewith now, U.S. Pat. No. 6,061,752.

COMPUTER SYSTEM OVERVIEW

Figure 1:
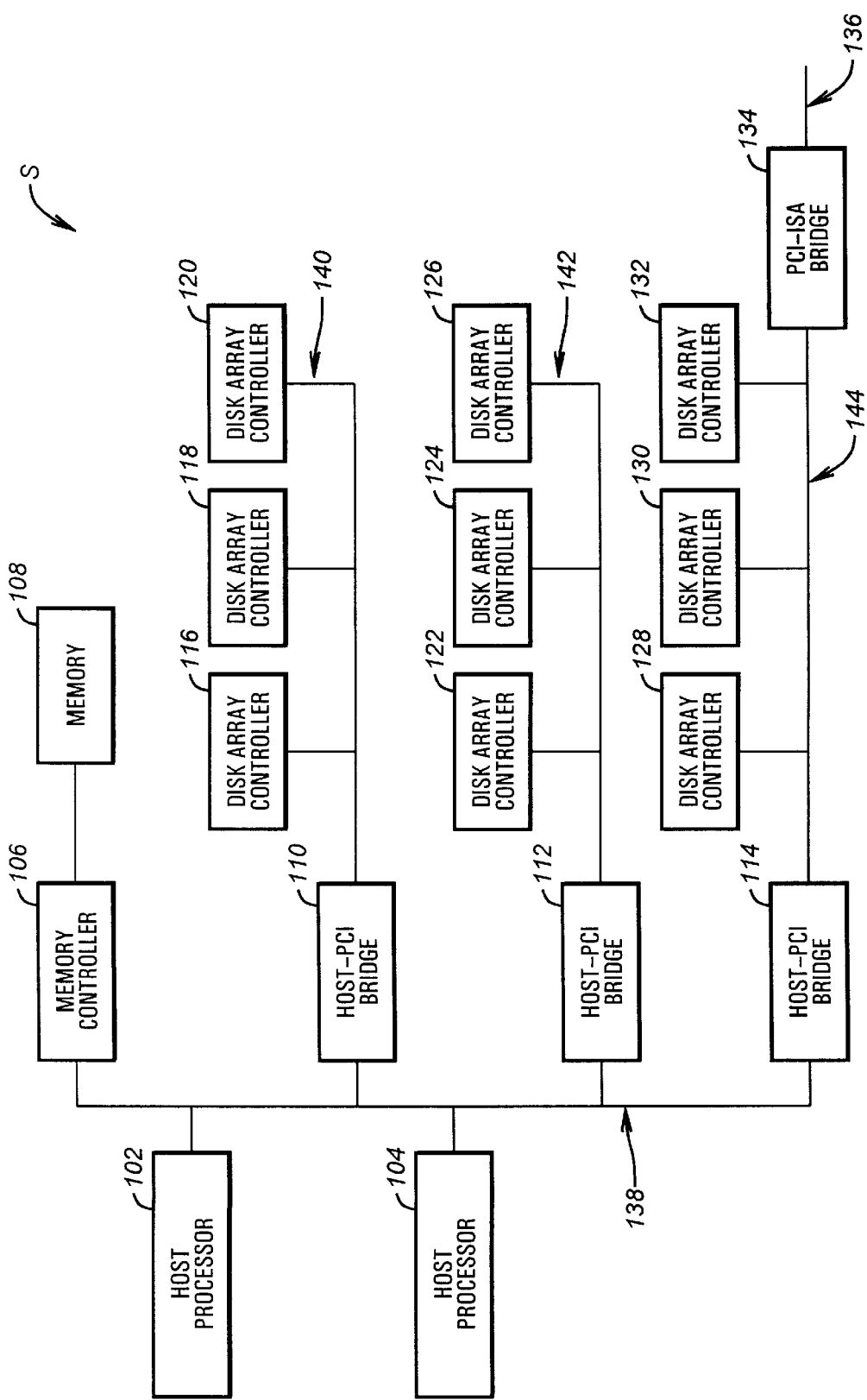
FIG. 1 is a block diagram of a computer system S implemented according to an embodiment of the present invention.

Turning to FIG. 1, illustrated is a typical computer system S implemented according to the invention. While the system S is illustrative of one embodiment, the techniques according to the invention can be implemented in a wide variety of systems. In the preferred embodiment the computer system S is a server for controlling a mass storage peripheral. The computer system S in the illustrated embodiment is a peripheral component interconnect (PCI) bus/industry standard architecture (ISA) bus based machine, having multiple PCI buses 140, 142, and 144 and an ISA bus 136. The multiple PCI buses 140–144 are controlled by PCI controller circuitry located within a corresponding host-PCI bridge 110, 112, or 114. The host-PCI bridges 110–114 couple the corresponding PCI buses 140–144 to host processors 102 and 104 via a host bus 138 and to a memory controller 106. The memory controller 106 controls host memory 108. A PCI-ISA bridge 134 connects the PCI bus 144 and the ISA bus 136.

The host bridges 110–114 can be 440LX integrated circuits manufactured by Intel Corporation. The ISA bridge 134 can be a PIIX4, also manufactured by the Intel Corporation. The host bridges 110–114 and the ISA bridge 134 provide capabilities other than bridging between the processors 102 and 104 and the PCI buses 140–144, and the PCI bus 144 and the ISA bus 136. Specifically, the disclosed host bridges 110–114 include interface circuitry that couples the host bus 138 to the appropriate PCI bus 140–144.

The host bridges 110–114 are preferably coupled to the host processors 102 and 104, which can be Pentium Pro processors. The Pentium Pro processors 102 and 104 could be replaced with different processors other than the Pentium Pro without detracting from the spirit of the invention. The processors 102 and 104 are capable of running any of a number of operating systems, such as Windows 95®, Windows NT®, or a Unix based operating system. In the disclosed embodiment of the present invention, the processors 102 and 104 run Windows NT 5.0®.

The host bridges 110–114, when the Intel 440LX is employed as the host bridge, supports extended data out (EDO) dynamic random access memory (DRAM) and synchronous DRAM (SDRAM), a sixty four/seventy two bit data path memory, a memory capacity of one gigabyte, dual inline memory module (DIMM) presence detect, eight row address strobe (RAS) lines, error correcting code (ECC) with single and multiple bit error detection, read-around-write with host for PCI reads, and 3.3 volt DRAMs. The host bridges 110–114 can support up to sixty (sixty megahertz) DRAMs.

The ISA bridge 134, when the PIIX4is employed as the ISA bridge, also includes enhanced power management. It supports the PCI bus 144 at thirty or thirty-three megahertz and the ISA bus 136 at one-fourth of the PCI bus frequency. PCI revision 2.1 is supported with both positive and subtractive decoding. The standard personal computer input/output (I/O) functions are supported, including a direct memory access (DMA) controller, two 82C59 interrupt controllers, an 8254 timer, a real time clock (RTC) with a two hundred fifty six byte complementary metal oxide semiconductor (CMOS) static random access memory (SRAM), and chip selects for system read only memory (ROM), keyboard controller, an external microcontroller, and two general purpose devices. The enhanced power management within the ISA bridge 134 includes full clock control, device management, suspend and resume logic, advanced configuration and power interface (ACPI), and system management bus (SMBus) control, which implement the inter-integrated circuit (I$^2$C) protocol.

Each of the PCI buses 140–144 can couple a variety of devices that generally take advantage of a high speed data path. In the disclosed embodiment a maximum of three disk array controller cards can be coupled to each of the PCI buses 140–144. In the preferred embodiment, each disk array controller card 116, 118, I2O). 122, 124, 126, 128, 130, and 132 is programmed as a RAID controller.

Again, it should be understood that a wide variety of systems could be used instead of the disclosed system S without detracting from the spirit of the invention. Further, other current and future operating systems could be utilized as well. In addition, the disk array controller cards 116–132 could potentially control various mass storage peripherals which include: tape drives, WORM, CD-ROM, and optical storage devices.

Figure 2:
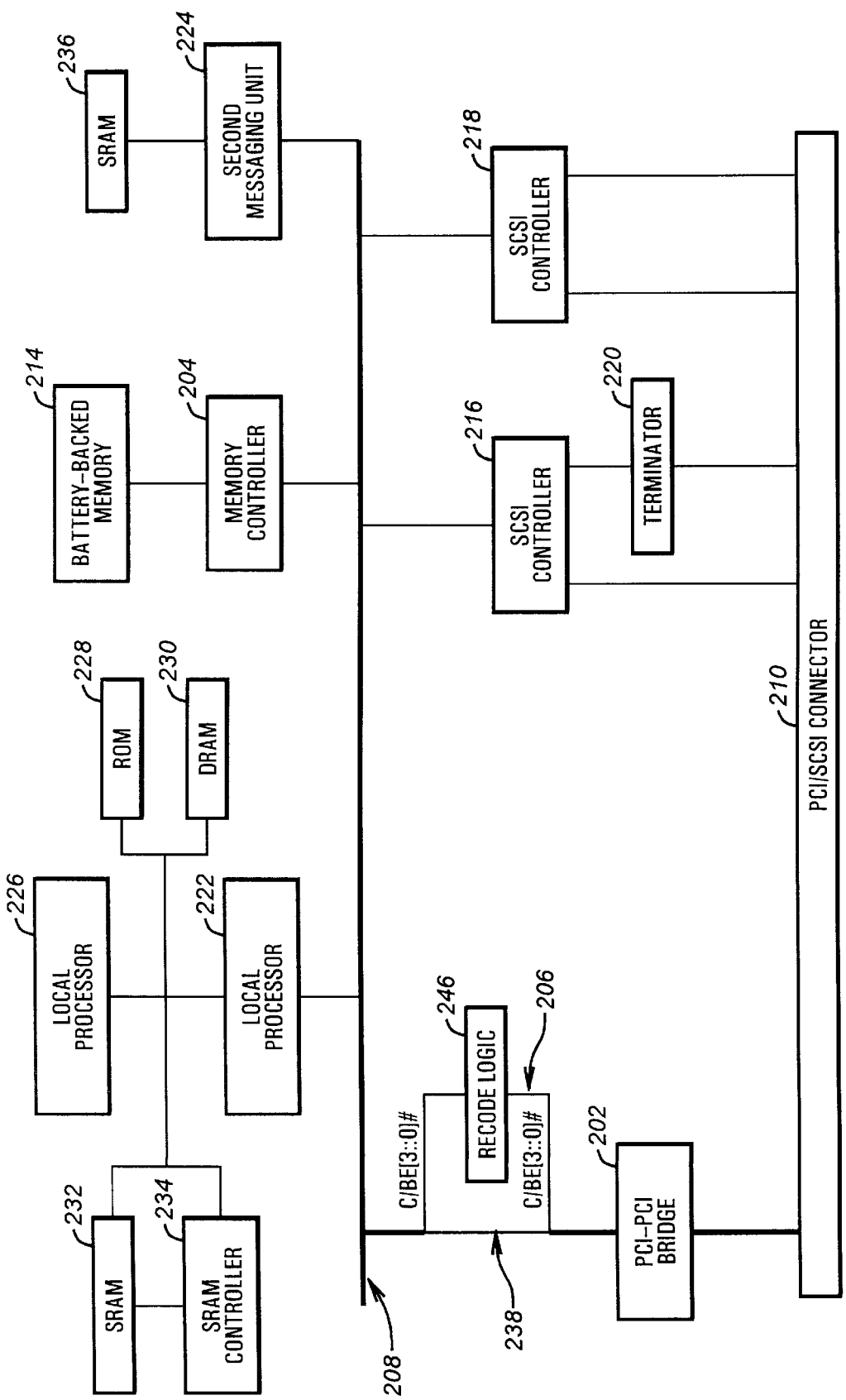
FIG. 2 is a block diagram of a disk array controller card according to an embodiment of the present invention.

Turning now to FIG. 2 the disk array controller cards 116–132 of the present invention are illustrated. It should be understood that the disk array controller circuitry could reside on a host system board or elsewhere, instead of residing on a peripheral card, without detracting from the spirit of the invention. The disk array controller cards 116–132 include a connector 210 which is used to couple the disk array controller cards 116–132 to the host system buses 140–144 and to a small computer system interface (SCSI) disk array (not shown). A bridge 202 is coupled to the host system buses 140–144 by way of the connector 210.

In a disclosed embodiment, the bridge 202 is a PCI-PCI bridge which is a standardized PCI Rev. 2.1 compliant bridge. In this embodiment the PCI-PCI bridge 202 is an IBM 82353 manufactured by International Business Machines. The PCI-PCI bridge 202 interfaces the host system bus 140–144 to a local bus 208 of the appropriate disk array controller card 116–132. In the preferred embodiment the local bus 208 is a PCI bus. CBEs 206 from the PCI-PCI bridge 202 are routed to recode logic 246. The recode logic 246 is contained within a complex programmable logic device (CPLD). An application specific integrated circuit (ASIC) provides for controlling battery-backed memory 214 through a memory controller 204.

The remainder of the PCI signal lines 238 from the PCI-PCI bridge 202 are directly coupled to the local bus 208. Also coupled to the local bus 208 are the SCSI controllers 216 and 218. Each of the SCSI controllers 216 and 218 present one load to the local bus 208. In the preferred embodiment the SCSI controllers 216 and 218 are PCI dual channel SCSI multi-function controllers (part number SYM53C876) manufactured by Symbios Logic. A first channel of the SCSI controller 216 is coupled to the connector 210. A second channel of the SCSI controller 216 is coupled to a terminator 220. The output of the terminator 220 is coupled to the connector 210. The second channel of the SCSI controller 216 is utilized as an inter-controller communication link. This link allows redundant disk array controller cards to communicate. This communication is desirable to ensure write cache coherency between the redundant disk array controller cards. Both first and second channels of the SCSI controller 218 are coupled to the connector 210. In addition to coupling the local bus 208 of one of the disk array controller cards 116–132 to the host system bus 140–144 by way of the PCI-PCI bridge 202, the connector 210 serves to couple the SCSI controllers 216 and 218 to the SCSI disk arrays (not shown).

The disclosed embodiment of the present invention utilizes two independent messaging units; a first messaging unit (FMU) 222 and a second messaging unit (SMU) 224. The configurable interface of the disk array controller cards 116–132 is realized through the FMU 222 or the SMU 224 either of which can be utilized to control an attached peripheral. Utilizing existing non-volatile random access memory (NVRAM) within the computer system S allows the OS to determine which of the messaging units is being utilized. This allows the OS to determine which OS driver to load. Depending on whether a particular bit in the NVRAM is set, either a high speed proprietary driver or a lower speed I2O compatible driver is installed. Utilizing a system configuration utility allows for changing the NVRAM bit, which in turn affects which driver is installed. By default, the high speed proprietary driver is installed. A CPLD on the disk array controller card 116–132 examines the NVRAM bit to determine in which mode the disk array controller card 116–132 will operate.

The SMU 224 is not utilized when the high speed proprietary driver is installed. Both the FMU 222 and the SMU 224 are utilized when the I2O compatible driver is installed. The SMU 224 translates I2O messages for the disk array controller cards 116–132 when active. Which configuration is most advantageous, from a system designer's viewpoint, is determined by whether speed or I2O standardization is most important.

When the SMU 224 is inactive, the FMU 222 receives commands from a first operating system driver which is the high speed proprietary driver. The first operating system driver allows more efficient control of a RAID array since the driver has been customized for control of the RAID array with unnecessary layers of software not specific to the task being deleted from the driver. When the SMU 224 is active, the FMU 222 receives commands from a second operating system driver which is the lower speed I2O compatible driver. Those I2O compatible commands are translated by the SMU 224 which effectively acts as a front-end for I2O commands. Thus, when the second operating system driver is utilized, both the FMU 222 and the SMU 224 are active.

The FMU 222 is used as a control agent for the SMU 224 and also provides the glue logic to interface a local processor 226 to the local bus 208. In the preferred embodiment the local processor 226 is an Am29040 manufactured by Advanced Micro Devices. The Am29040 is a high performance reduced instruction set computer (RISC) microprocessor that utilizes 32-bit architecture and is implemented using CMOS technology.

When an I2O OS driver is being used, the I2O compatible messaging unit SMU 224 responds to an I2O message by sending an interrupt to the local processor 226 through the FMU 222. The SMU 224 is also coupled to SRAM 236. The SRAM 236 provides local memory for the SMU 224. The local processor 226 is coupled to the FMU 222 and services interrupts from the SMU 224 through the FMU 222. Also coupled to the local processor 226 is DRAM 230, ROM 228, SRAM 232, and a SRAM controller 234.

The primary function of the SRAM controller 234 is to control the SRAM 232. The SRAM controller 234 is coupled to request and ready lines (not shown) of the local processor 226 and resides between the FMU 222 and the local processor 226 on those lines. In the preferred embodiment the SRAM controller is implemented in a CPLD. Executable boot code for the local processor 226 is stored in the ROM 228. A portion of the ROM 228 can be accessed through the local bus 208. The ROM 228 may include up to 256 KB of FLASH ROM. The local processor 226 utilizes the DRAM 230 and the SRAM 232 for storage of various routines.

In addition to the above, the FMU 222 also performs the following functions: converts processor memory or I/O cycles to cycles on the local bus 208; provides big to little endian conversion to allow the local processor 226 to communicate with the local bus 208; provides for PCI write posting from the local processor 226; provides an indirect processor to PCI port for configuration and other PCI cycles; provides a real time counter for performance and monitoring; provides interval timers, interrupt controllers, and a UART for processor use; provides peripheral decodes for external devices; provides a DRAM controller for accessing and refreshing the DRAM 230; provides a local processor interface to NVRAM through an I2C bus; and as elaborated on below provides an enhanced command interface for disk array controllers.

Figure 3:
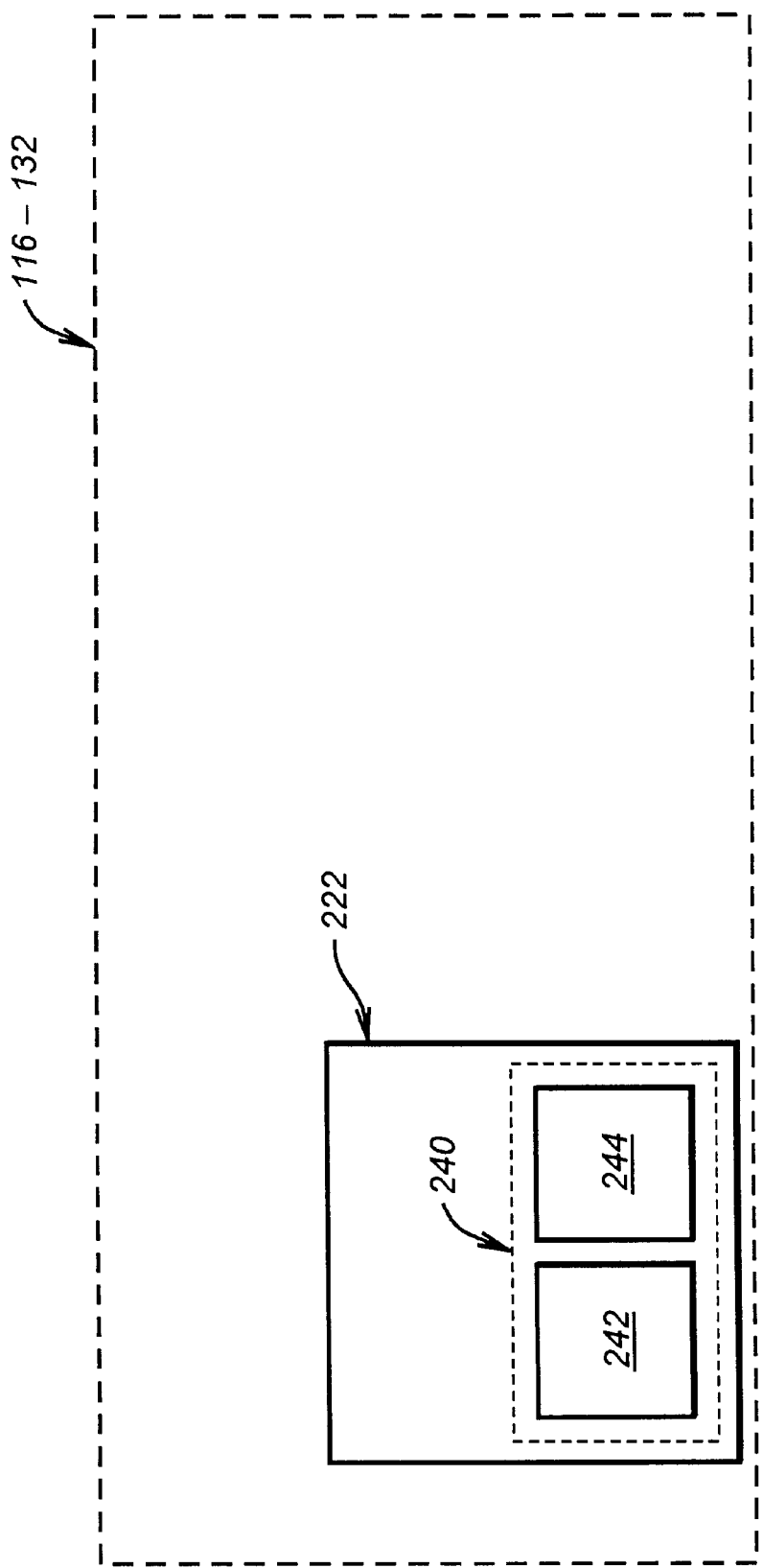
FIG. 3 is a block diagram of a FIFO command interface according to an embodiment of the present invention.

As briefly mentioned above, one function performed by the FMU 222 is the task of moving commands from the host memory 108 to an area that is accessible to the local processor 226. Turning to FIG. 3, this occurs when the host processor 102 or 104 notifies the local processor 226 that a command list has been built into the host memory 108 by writing the address of that list into a command pointer (CP) FIFO 242 which is located inside the FMU 222. This CP FIFO 242 is 16×32 bits and is capable of holding 16 different command list pointers. When a pointer is received the FMU 222 automatically retrieves 8 Dwords from the host memory 108 starting at the pointer location. The retrieved command list is stored in the CP FIFO 242. Once a command is collected in this manner the FMU 222 interrupts the local processor 226 to signal the local processor 226 that a command is available. The local processor 226 will then move the command list from the FMU 222 into the SRAM 232.

The FIFO interface 240 protocol reduces the number of I/O cycles required to pass information to the disk array controllers 116–132 with respect to the command lists residing in the host memory 108. To send a command, the CP FIFO 242 register Dword is read to make sure space is available in the CP FIFO 242 and then the address to the command list in the host memory 108 is written to it. A read of the CP FIFO 242 register returns the address of the completed command list.

In general, a FIFO interface OS driver builds command list data structures in the host memory 108 and then tells the disk array controller 116–132 to execute them by specifying their physical addresses. When the disk array controller 116–132 completes the command list, it notifies the OS driver of the command list's physical address.

While the CP FIFO 242 has briefly been discussed, the FIFO interface 240 is actually based upon two FIFOs. One FIFO is for sending command lists and the other is for receiving completed command lists. Each FIFO is accessed through an individual 32 bit register. The first FIFO as previously introduced is the CP FIFO 242. As briefly discussed, the purpose of the CP FIFO 242 is to provide a channel to send commands to the local processor 226.

The CP FIFO 242 can hold up to 16 Dwords. Each Dword is the address of an individual command list that has been prepared by the OS driver and resides in the host memory 108. When this CP FIFO 242 register is read it will return the number of positions available in the CP FIFO 242. A value of zero indicates there is no room for another command pointer at that time. When a non-zero value is read the OS driver can submit that many command pointers consecutively without having to read the CP FIFO 242 register again. The OS driver may choose to unmask an interrupt that is generated when the CP FIFO 242 is not full. This can be accomplished by setting the appropriate bit in an interrupt mask register. That same bit in an interrupt status register indicates the status of that interrupt at any point in time.

The second FIFO is denominated a command completion pointer (CCP) FIFO 244. The purpose of this CCP FIFO 244 is to provide a channel to receive notifications of completed command lists from the disk array controller 116–132. The CCP FIFO 244 can also hold up to 16 Dwords. Each Dword is the address of an individual command list that has been completed by the disk array controller 116–132 and resides in the host memory 108. The CCP FIFO 244 is a read only register, with respect to the OS driver, since its only purpose is to indicate command list completions to the OS driver. When the CCP FIFO 244 register is read it will either return the address of a completed command list or a value of zero. A value of zero indicates that there are no completions available at that time. When a non-zero value is read from this register the OS driver has the address of a completed command list and should check the status field in the host memory 108 to see if there was an error associated with the command list. Each read of this register causes a list pointer to be removed from the CCP FIFO 244. The OS driver may choose to unmask the interrupt that is generated when the CCP FIFO 244 has something in it. This can be accomplished by setting the appropriate bit in an interrupt mask register. The same bit in an interrupt status register shows the status of that interrupt at any point in time.

The FIFO interface 240 can accommodate the submission of command lists by more than one processor at a time. This is achieved by allowing a single entry point for the CP FIFO 242. The design for a multi-processor architecture may be different for each OS depending on the OS architecture, performance, and other design parameters.

Figure 4:
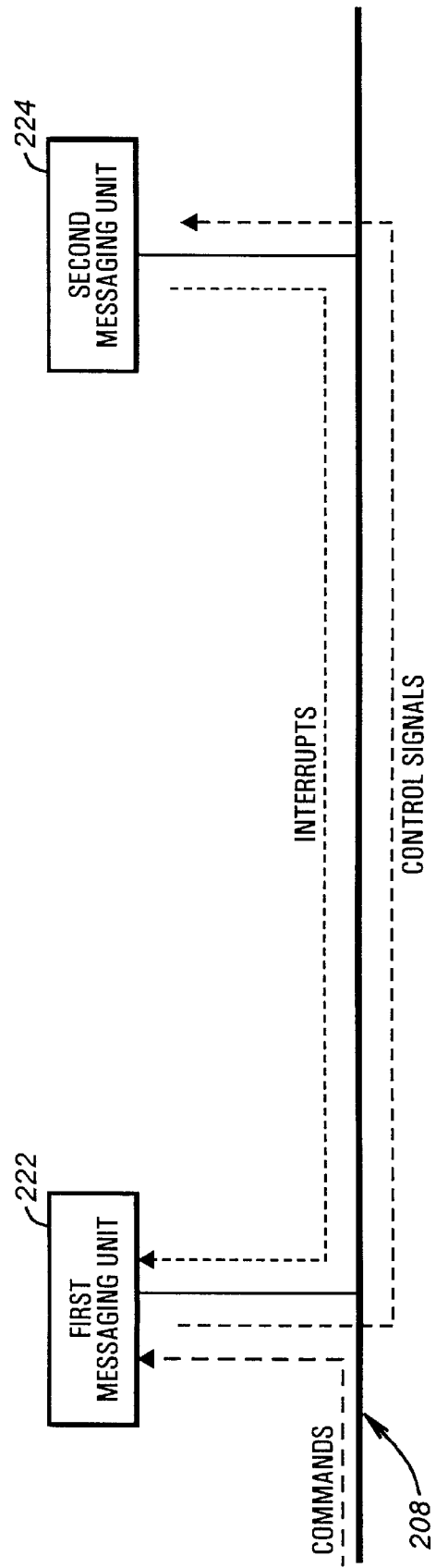
FIG. 4 is a block diagram of the signal flow between first and second messaging units of the disk array controller when configured to be I2O compatible.

Moving to FIG. 4, a block diagram depicting signal flow between the FMU 222 and the SMU 224 is illustrated. As previously discussed, the I2O specification defines a split driver model which yields device drivers called HDMs that are OS independent and OS drivers called OSMs that are independent of the HDMs. The HDMs and OSM communicate with each other through the passing of messages. When the FMU 222 receives a command from the operating system driver it determines whether the controller is operating in the I2O compatible mode. If the controller is operating in the I2O compatible mode the FMU 222 will respond by sending control signals to the SMU 224 over the local bus 208. The SMU 224 will perform certain tasks as specified by the control signals from the FMU 222. If the SMU 224 requires service by the local processor 226 the SMU 224 will generate an interrupt on the local bus 208. The FMU 222 will detect the interrupt from the SMU 224 and pass the service request to the local processor 226. The local processor 226 will then service the interrupt from the SMU 224 by executing an appropriate service routine.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A peripheral controller for coupling a mass storage peripheral to a computer system, the computer system running an operating system, the peripheral controller including a local bus, the peripheral controller comprising:

a first messaging unit coupled to the local bus, the first messaging unit adapted to communicate messages to and from a first operating system driver;

a second messaging unit coupled to the local bus, the second messaging unit adapted to communicate messages to and from a second operating system driver; and a peripheral interface coupled to the local bus and to the first and second messaging units, the peripheral interface controlling the peripheral responsive to messages sent to the first or second messaging units.

2. The peripheral controller of claim 1, wherein the local bus is a PCI bus.

3. The peripheral controller of claim 1, wherein the local bus is a PCI bus and a standard PCI-PCI bridge couples the local bus to a computer system PCI bus.

4. The peripheral controller of claim 1, wherein the peripheral interface is a SCSI interface.

5. The peripheral controller of claim 1, wherein the peripheral controller is programmed for RAID.

6. The peripheral controller of claim 1, the first messaging unit responding to commands from the first operating system driver which is non-standard.

7. The peripheral controller of claim 1, the second messaging unit responding to commands from the second operating system driver which is I2O compatible.

8. A peripheral controller for coupling a mass storage peripheral to a computer system, the computer system running an operating system, the peripheral controller including a local bus, the peripheral controller comprising:
 a first messaging unit coupled to the local bus, the first messaging unit adapted to communicate messages to and from a first operating system driver;
 a second messaging unit coupled to the local bus, the second messaging unit adapted to communicate messages to and from a second operating system driver; and
 a peripheral interface coupled to the local bus and to the first and second messaging units, the peripheral interface controlling the peripheral responsive to messages sent to the first or second messaging units, the second messaging unit responding to commands from the second operating system driver which is I2O compatible, wherein the second messaging unit operates only as a slave on the local bus.

9. A peripheral controller for coupling a mass storage peripheral to a computer system, the computer system running an operating system, the peripheral controller including a local bus, the peripheral controller comprising:
 a first messaging unit coupled to the local bus, the first messaging unit adapted to communicate messages to and from a first operating system driver;
 a second messaging unit coupled to the local bus, the second messaging unit adapted to communicate messages to and from a second operating system driver; and
 a peripheral interface coupled to the local bus and to the first and second messaging units, the peripheral interface controlling the peripheral responsive to messages sent to the first or second messaging units, the second messaging unit responding to commands from the second operating system driver which is I2O compatible, wherein the second messaging unit operates only as a slave on the local bus, wherein the first messaging unit also acts as a control agent for the second messaging unit.

10. The peripheral controller of claim 1, wherein the peripheral controller performs at a higher level when only the first messaging unit is utilized.

11. The peripheral controller of claim 1, wherein the first operating system driver is high-speed but non-standard and the second operating system driver is low-speed but standard.

12. A computer system comprising:
 a system bus;
 a processor coupled to the system bus;
 a peripheral controller for coupling a peripheral to the computer system, the computer system running an operating system, the peripheral controller including a local bus, the peripheral controller comprising:
  a first messaging unit coupled to the local bus, the first messaging unit adapted to communicate messages to and from a first operating system driver;
  a second messaging unit coupled to the local bus, the second messaging unit adapted to communicate messages to and from a second operating system driver; and
  a peripheral interface coupled to the local bus and to the first and second messaging units, the peripheral interface controlling the peripheral responsive to messages sent to the first or second messaging units.

13. The computer system of claim 12, wherein the local bus within the peripheral controller is a PCI bus.

14. The computer system of claim 12, wherein the local bus within the peripheral controller is a PCI bus and a standard PCI-PCI bridge couples the local bus to the system bus which is a PCI bus.

15. The computer system of claim 12, wherein the peripheral interface is a SCSI interface.

16. The computer system of claim 12, wherein the peripheral controller is programmed for RAID.

17. The computer system of claim 12, the first messaging unit responding to commands from the first operating system driver which is non-standard.

18. The computer system of claim 12, the second messaging unit responding to commands from the second operating system driver which is I2O compatible.

19. A computer system comprising:
 a system bus;
 a processor coupled to the system bus;
 a peripheral controller for coupling a peripheral to the computer system, the computer system running an operating system, the peripheral controller including a local bus, the peripheral controller comprising:
  a first messaging unit coupled to the local bus, the first messaging unit adapted to communicate messages to and from a first operating system driver;
  a second messaging unit coupled to the local bus, the second messaging unit adapted to communicate messages to and from a second operating system driver; and
  a peripheral interface coupled to the local bus and to the first and second messaging units, the peripheral interface controlling the peripheral responsive to messages sent to the first or second messaging units, the second messaging unit responding to commands from the second operating system driver which is I2O compatible, wherein the second messaging unit operates only as a slave on the local bus.

20. A computer system comprising:
 a system bus;
 a processor coupled to the system bus;
 a peripheral controller for coupling a peripheral to the computer system, the computer system running an operating system, the peripheral controller including a local bus, the peripheral controller comprising:
  a first messaging unit coupled to the local bus, the first messaging unit adapted to communicate messages to and from a first operating system driver;

a second messaging unit coupled to the local bus, the second messaging unit adapted to communicate messages to and from a second operating system driver; and a peripheral interface coupled to the local bus and to the first and second messaging units, the peripheral interface controlling the peripheral responsive to messages sent to the first or second messaging units, the second messaging unit responding to commands from the second operating system driver which is I2O compatible, wherein the second messaging unit operates only as a slave on the local bus, wherein the first messaging unit also acts as a control agent for the second messaging unit.

21. The computer system of claim 12, wherein the peripheral controller performs at a higher level when only the first messaging unit is utilized.

22. The computer system of claim 12, wherein the first operating system driver is high-speed but non-standard and the second operating system driver is low-speed but standard.

* * * * *